July 28, 1925.
G. F. FISHER
AUTOMATIC ANIMAL TRAP
Filed June 28, 1922  3 Sheets-Sheet 1
1,547,375
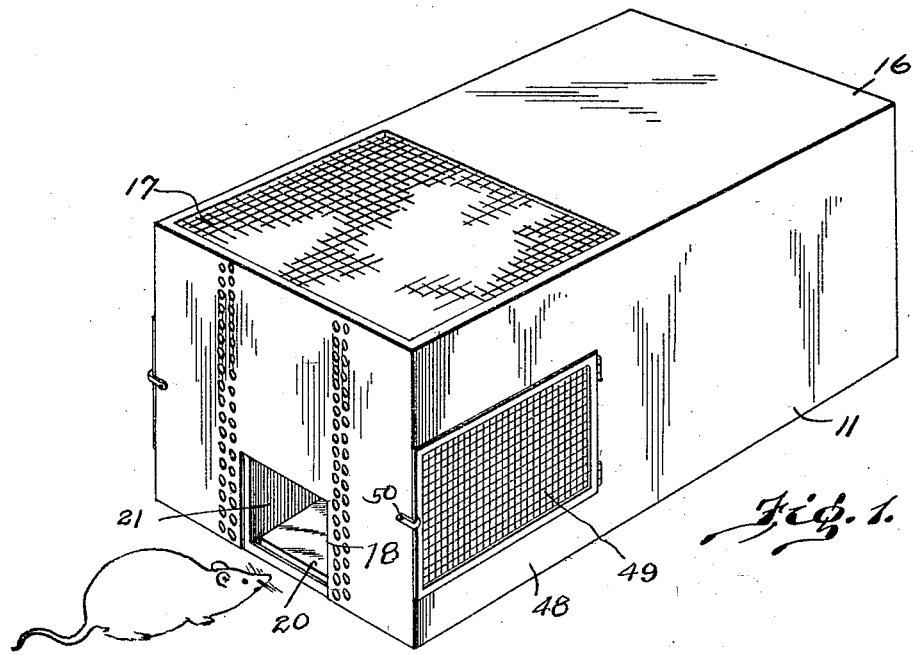
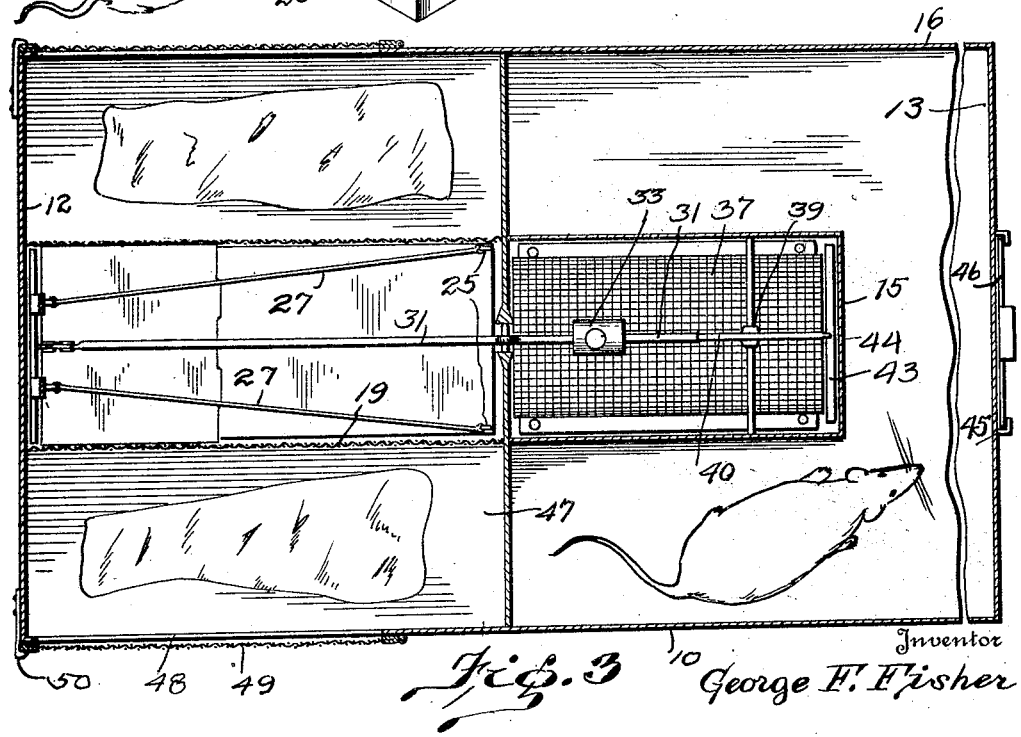
Inventor
George F. Fisher
By Eugene C. Brown
Attorney

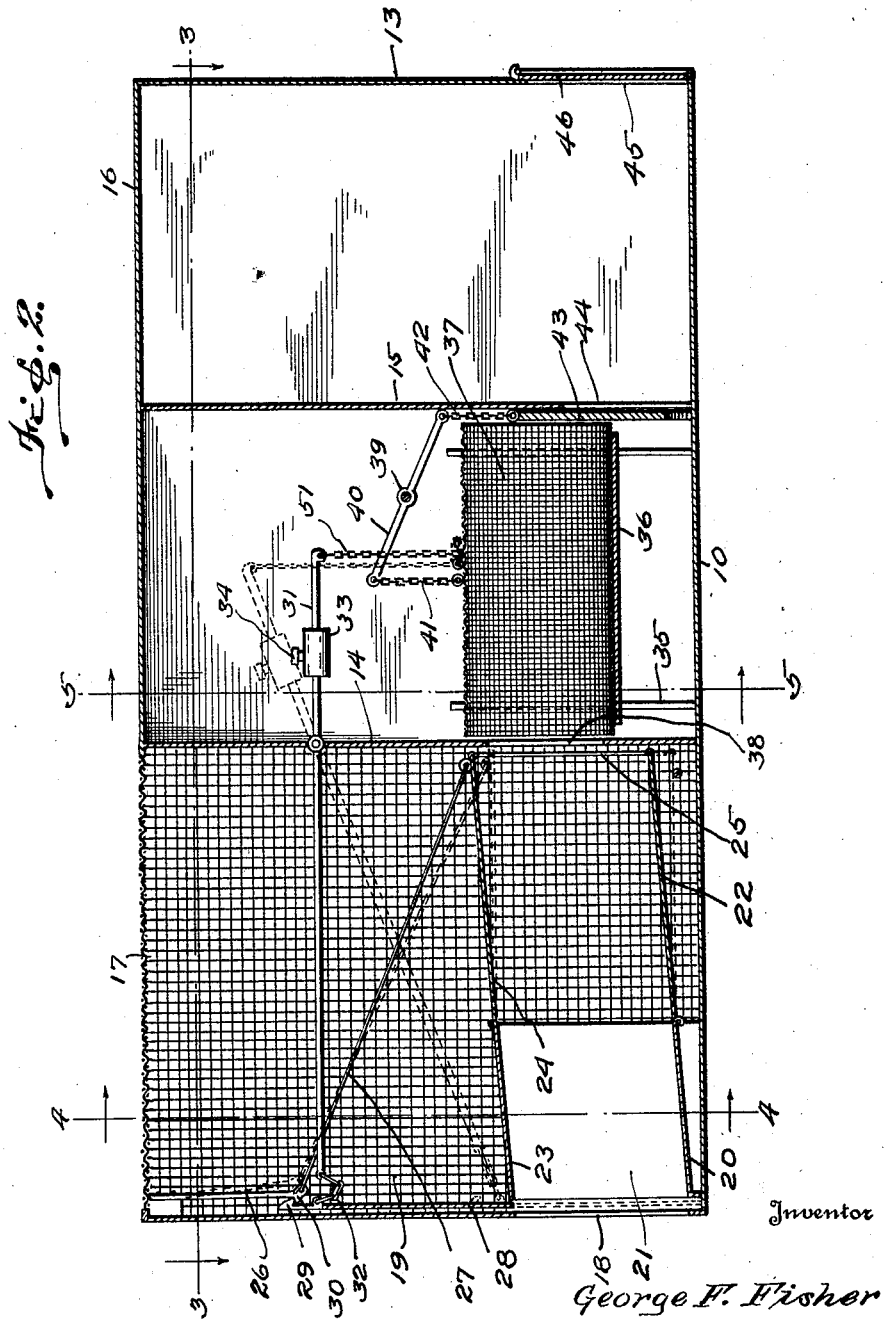

July 28, 1925. 1,547,375

G. F. FISHER

AUTOMATIC ANIMAL TRAP

Filed June 28, 1922   3 Sheets-Sheet 3

Inventor
George F. Fisher
By Eugene C. Brown
Attorney

Patented July 28, 1925.

1,547,375

UNITED STATES PATENT OFFICE.

GEORGE F. FISHER, OF LEEDEY, OKLAHOMA.

AUTOMATIC ANIMAL TRAP.

Application filed June 28, 1922. Serial No. 571,463.

*To all whom it may concern:*

Be it known that I, GEORGE F. FISHER, a citizen of the United States, residing at Leedey, in the county of Dewey and State of Oklahoma, have invented certain new and useful Improvements in Automatic Animal Traps, of which the following is a specification.

This invention relates to animal traps and has special reference to an automatic resetting cage trap.

The principal objects of this invention are to provide an improved form of cage trap wherein the operation of the trap will be effected in a novel and improved manner by the action of an animal such as a mouse or rat entering the trap, as well as to provide an improved automatic means for coaxing the animal from one part of the trap to the other until it arrives at the inner chamber from which it cannot find exit. Also provision is made of novel character for displaying the bait before the animal in such an improved manner as will induce it to enter the first passage or vestibule of such a trap.

With the above and other objects in view, the invention consists in general of certain novel details of construction and combinations of parts hereinafter fully described, illustrated in the accompanying drawings, and specifically claimed.

Figure 1 is a perspective view of a trap constructed in accordance with this invention.

Figure 2 is a longitudinal median section taken vertically through the trap.

Figure 3 is a section on the line 3—3 of Figure 2.

Figure 4:
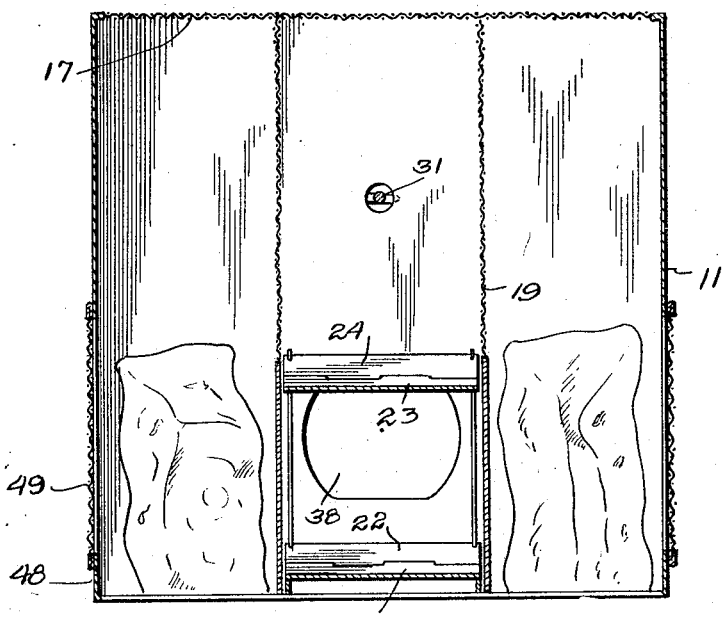
Figure 4 is a section on the line 4—4 of Figure 2.
Figure 5:
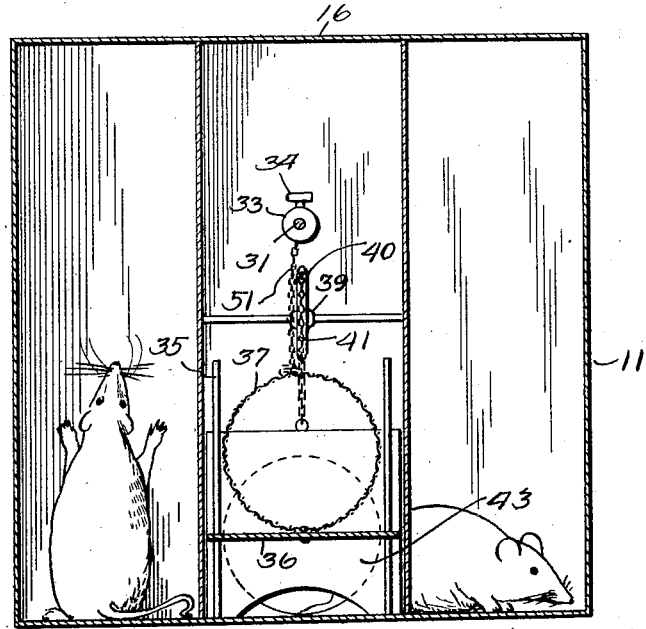
Figure 5 is a section on the line 5—5.

In the present embodiment of the invention there is provided a trap having a bottom 10, side walls 11, a rear wall 13. Across the trap somewhat closer to the front wall than the rear wall extends the partition 14 and about half way from this partition to the rear wall is a second partition 15.

The top of the trap is formed at a rear portion 16 which may be of imperforate material and a front portion 17 preferably of screen wire, the rear portion of the trap extending rearwardly from the partition 14 while the front reticulated portion extends forwardly from such partition. In the front wall 12 at the bottom central portion thereof is formed an opening 18 and extending rearwardly from this front wall at each side of the opening 18 is a longitudinal partition 19 which terminates rearwardly against the transverse partition 14. Extending rearwardly from the opening 18 is a floor 20. At each side of the floor 20 the longitudinal partition is formed of imperforate material, this taking the place of the reticulated material 19 at these points. The floor 20 slopes upward toward the rear and at its rear end is hinged to the front end of a drop floor 22. Spaced above the floor 20 is a ceiling or top plate 23, to the rear end of which is hinged a movable top plate 24. The movable floor 22 and the plate 24 are connected at their rear ends by rods 25. At the top of the floor part of the trap is a spring 26 which is connected by means of a rod 27 with the rear end of the top plate 24. Thus, this spring, through the rod 27, holds the movable floor 22 normally elevated. The longitudinal partitions 21 and floor 20 are spaced slightly to the rear of the front wall so that between this floor and the front wall may drop a front door 28 which is normally held elevated by the engagement of a hook 29 on its upper edge with a similar but reversely positioned hook 30 on the spring 26. Extending through the partition 14 is a lever 31 to the forward end of which is connected a short chain 32 which is in turn connected to the top of the door 28. The rear end of this lever 31 is provided with a counterbalance 33 held in adjusted position on the lever by a screw 34.

Extending upward from the floor 10 between the partitions 14 and 15 are standards 35 whereon is mounted a vertically sliding platform 36 carrying a screen wire cylinder 37 having its ends open and extending from the partition 14 to the partition 15. An opening 38 is formed in the partition 14 and is so positioned that, with the platform 36 fully raised, the opening 38 will afford easy access to the cylinder 37, this cylinder constituting an elevator cage. In order to hold the cylinder 37 normally alined with the opening 38 there is provided a transverse rod 39 extending between the side walls 11 and on this rod is mounted a lever 40 which overlies the cylinder 37 and has its front end connected to such cylinder by a chain 42 with the top of the combined counterweight and door 43 which normally closes the opening 44 in the bottom of the partition 15. The rear wall 13 is provided with an opening 45 which is normally closed by means of a slide 46. It will be observed from Figure 3 that, by reason of the partitions 19, the front partition of the trap is divided into a central vestibule and two lateral bait chambers 47. Access is had to each of these bait chambers by means of an opening 48 in the respective side wall 11, this opening being normally closed by a swinging door 49 of reticulated material. Each door 49 is held shut, when closed, by a latch 50. In the operation of the device the animal, upon discovering the bait in the trap, noses around the outside of the trap until it reaches the vestibule. It there passes inward beyond the side walls 21 and upon stepping on the movable or drop floor 22, its weight causes this floor to move downward. The downward movement of this floor pulls downward on the rods 27 and releases the latch hooks 30. This permits the door 28 to fall behind the animal and assume the dotted line position shown in Figure 2. As the door falls in this manner, the lever 31 also assumes this dotted line position. Now the rear end of this lever is connected by a chain 51 with the elevator cylinder 37. When the animal finds his exit cut off by the door 28 he will pass into this elevator cylinder and as soon as this is done the cylinder will drop. The dropping of the cylinder prevents backward passage of the animal and at the same time raises the door 43 so that he passes through the opening 44 into the body of the trap. As the cylinder descends, the chain 51 is tensioned and the lever 31 tilts upward and raises the door 28 thereby again setting the front or vestibule portion of the trap. As soon as the rat or other animal jumps out of this elevator cylinder 37 into the body of the trap the elevator will rise, being relieved of his weight and the door 43 will close behind him. Thus the trap will again be set ready for a second animal. When it is desired to remove the animal it is merely necessary to open the rear door 46 provided for this purpose.

There has thus been provided a simple and efficient device of the kind described and for the purposes specified.

Having thus described the invention, what is claimed as new, is:—

1. A rat trap consisting of a cagelike outer structure provided with a partition spaced from the rear end and having an opening therein constituting a door opening leading to the rear of the partition, an elevator cage in front of said partition and open at both ends, and a counterweight having means for connection to the elevator cage and normally closing the door opening, said counterweight moving to open the door upon downward movement of the elevator under the weight of an animal.

2. A rat trap consisting of a cagelike outer structure having a normally open front door and a vestibule leading therefrom, a partition at the rear of the vestibule having a raised opening therein, a second partition spaced rearwardly of the first and having an opening therein displaced downwardly with relation to the opening in the first partition, an elevator cage between said partitions and having open ends, said cage being movable to bring the openings in the respective ends into and out of registry with the respective partition openings, and a counterweight having operative connection with said elevator to normally hold the same raised, said counterweight normally constituting a door for the opening in the second partition.

3. A rat trap consisting of a cagelike outer structure having a normally open front door arranged to close by the action of gravity and a vestibule leading therefrom, a partition at the rear of the vestibule having a raised opening therein, a second partition spaced rearwardly of the first and having an opening therein displaced downwardly with relation to the opening in the first partition, an elevator cage between said partitions and having open ends, said cage being movable to bring the openings in the respective ends into and out of registry with the respective partition openings, means associated with the vestibule for effecting release of the front door, a counterweight having operative connection with said elevator to normally hold the same raised, said counterweight normally constituting a door for the opening in the second partition.

4. A rat trap consisting of cakelike outer structure having a normally open front door arranged to close by the action of gravity and a vestibule leading therefrom, a partition at the rear of the vestibule having a raised opening therein, a second partition spaced rearwardly of the first and having an opening therein displaced downwardly with relation to the opening in the first partition, an elevator cage between said partitions and having open ends, said cage being movable to bring the openings in the respective ends into and out of registry with the respective partition openings and other means connecting the front door and elevator cage to restore the door to open position upon downward movement of the elevator cage, a counterweight having operative connection with said elevator to normally hold the same raised, said counterweight normally constituting a door for the opening in the second partition.

In testimony whereof I affix my signature.

GEORGE F. FISHER.